March 1, 1960

T. B. HALLAM ET AL 2,926,770

ARTICLE HANDLING MACHINE

Filed Dec. 19, 1957

INVENTORS
Thomas B. Hallam
Brian H. Jones
George H. Kidd
BY Bacon & Thomas
ATTORNEYS

United States Patent Office 2,926,770
Patented Mar. 1, 1960

2,926,770

ARTICLE HANDLING MACHINE

Thomas Bertram Hallam, Isleworth, and Brian Harold Jones, Hillingdon, England, and George Herbert Kidd, Toronto, Ontario, Canada, assignors to The Sperry Gyroscope Company Limited, Brentford, Middlesex, England, a company of Great Britain Application December 19, 1957, Serial No. 703,949

Claims priority, application Great Britain January 22, 1957

6 Claims. (Cl. 198—21)

This invention relates to machines of the kind provided with transfer means for feeding articles to be operated on by a machine from a source of supply such as a conveyor belt to a station where the operation is to be performed. The actual operation performed by the machine is not of the essence of the invention, which is concerned primarily with the means for conveying the articles to the operating station. However, the invention is adapted for use with check weighing machines for determining whether articles supplied to the machine are above or below a certain minimum weight, and for convenience the invention will be described as applied to such a check weighing machine. It is, however, to be understood that the invention is not limited to use with weighing machines.

According to one aspect of the present invention, a weighing or other machine includes transfer means for feeding articles to be operated on along a feed path to an operating station, means responsive to an initiation signal for effecting the weighing or other operation upon an article at the station, and means for generating an initiation signal in response to the arrival of an article at a certain point in the feed passage on its way to the operating station. Conveniently, an article operated on is removed from the station by the next article as it moves on to the station, and the arrangement described insures that the operation is not carried out on the article on the station unless a following aricle which can be used to push the article off the station is on its way. This prevents the article being operated upon twice. Preferably, of course, the point in the feed path where an article must arrive for the generation of an initiation signal is sufficiently in advance of the operating station to allow the operation to be completed before the next article arrives to push it off, while the point will also preferably be near enough to the station for the next article to be in position on the operating station before the next initiation signal is given by another article reaching the point in the feed path.

According to another aspect of the invention a weighing or other machine includes transfer means arranged to transfer articles to be operated on from an assembly position in a feed path to an operating station, which transfer means operates in regular cycles to transfer one article per cycle, whereby, however irregularly the articles arrive at the assembly position, they will be transferred to the operating station with substantially uniform spacing. It may be necessary to provide a clamp or gate for preventing an article from moving into the assembly position until the preceding article has been removed from it. Thus, if a platform defining the assembly position moves to transfer an article from it, this movement may be accompanied by the closing of a clamp on the path leading to the assembly position. Alternatively the platform itself may act as a gate.

In one embodiment of the invention any cycle of the transfer means may be an operative or inoperative cycle in dependence on the operation of a trigger which is operated only when an article is in the assembly position at the beginning of a cycle. In other words, if an article is in the assembly position at the beginning of a cycle, that cycle will be an operative cycle, while if no article is in that position, that cycle will be an inoperative cycle.

This may be effected by mounting the trigger at the end of a transfer platform defining the assembly position, which trigger is arranged to control the response of the platform to cyclically-operating mechanism for moving the platform to a position where a conveyor can act on it to move an article upon it to the operating station. For example, if the transfer platform is lowered from a normal position in an operative cycle, conveyor fingers sweeping the platform once in every cycle may be arranged to pass over the lowered platform in the operative cycles, and to pass under the platform when the latter is in raised position during inoperative cycles.

According to a further aspect of the invention, means for transferring the articles from such a platform or the like to the operating station are arranged to have substantially zero net velocity at the instant they first make contact with an article on the platform, and/or are arranged to have their forward velocity reduced gradually as an article approaches the operating station so that when the conveyors cease to act on an article, the forward velocity of the article will be small.

In one form of this aspect of the invention the conveyors comprise arms pivoted about axes perpendicular to the plane of movement, the arms being mounted on carriers driven at constant speed in the direction of the weighing station, while cam means are provided for pivoting the arms against the direction of travel to reduce their net forward velocity at the instant when they first make contact with an article on the platform and/or when they are about to lose contact with an article in the operating station.

Such an arrangement reduces the likelihood of damage to the article by its being struck by the conveyor arms, and it also assists in leaving the article always in the same position in the operating station, as the article will be almost stationary when it loses contact with the arms and will not tend to slide forward to any substantial extent.

According to a further aspect of the invention, movement of the articles through the machine from inlet to outlet by way of the operating position is in a substantially straight line.

The invention may be carried into practice in various ways and one specific embodiment will now be described by way of example as applied to a check weigher with reference to the accompanying drawings, in which.

Figure 1:
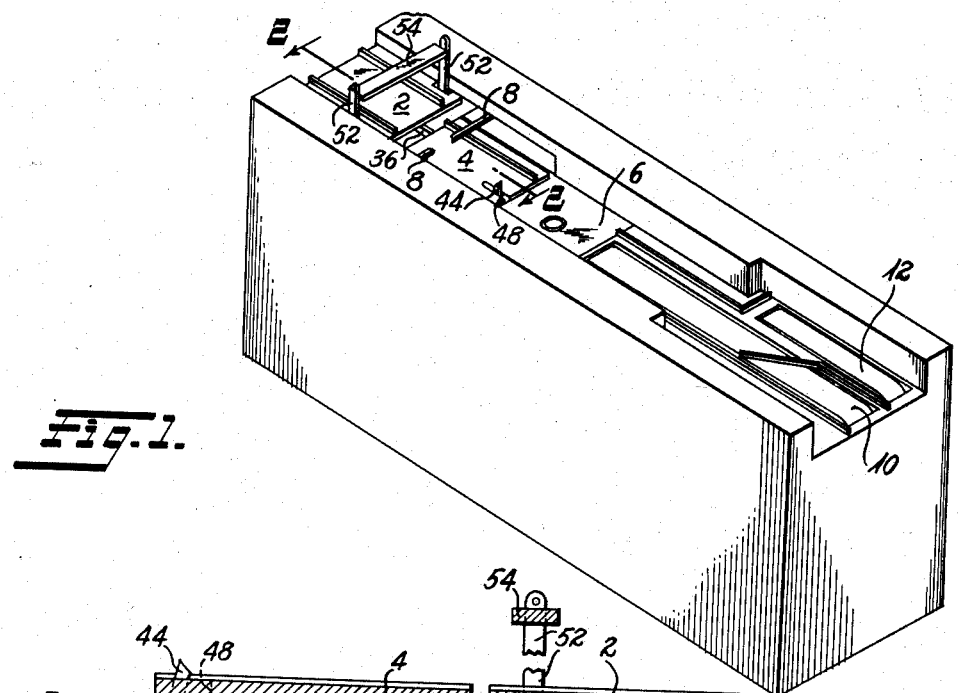
Fig. 1 is a schematic perspective view showing the general arrangement of the check weigher.

The check weigher is arranged to receive articles delivered to it along a conveyor belt or the like along an input path or guide 2 from which the articles are pushed by pressure from the following articles on to a transfer platform 4 which operates when an article is correctly positioned upon it to lower the article to a position in which it can be removed from the platform on to the weighing platform 6 by a pair of conveyor arms 8. The article is weighed after the transfer platform 4 is raised again in readiness for the next article. Depending upon whether the weight of the article is above or below a certain minimum weight, the article will leave the weighing platform 6 along one of two delivery paths, a correct or overweight path 10 and an underweight path 12, conveniently by being pushed by the following article as it is moved in turn on to the weighing platform by the conveyor fingers. No means are shown herein for directing the articles to either path 10 or 12 in response to the weighing operation since any suitable mechanism could be used for that purpose and forms no part of the present invention. However, the apparatus shown in the patent to James C. Petrea, 2,701,639, of February 8, 1955, is readily adapted to be used for this purpose.

In order that an article on the weighing platform 6 will not be weighed more than once if there is no article following it along the conveyor belt to push it from the weighing platform, it is arranged that the weighing operation is initiated by lowering of the transfer platform 4 and the transfer platform cannot be lowered until an article is correctly positioned upon it.

Thus, a switch 14 initiating the weighing operation by operation of a single-cycle clutch (not shown) is closed when the transfer platform 4 is lowered. The arrangement is such that the weighing operation is just completed by the time the article which caused initiation arrives at the weighing platform to push the weighed article off, while the unweighed article has time to take up its position on the weighing platform before the next article can initiate a further weighing operation. Apart from the initiation means, the actual weighing apparatus is of a conventional nature and may be of the type shown in said Patent 2,701,639.

The transfer platform 4 is mounted on a generally vertical support 16 which is located substantially centrally between the side edges of the platform and linked to a fixed vertical pedestal 18 through two links 20 and 22 forming a parallelogram linkage with the lower end of the support 16 and the upper end of the pedestal 18. The two links 20 and 22 are inclined upwards from the pedestal 18 at a few degrees so that the downward motion of the platform 4 is accompanied by a small component of motion away from the input guide 2.

The upper link 22 is constituted by one end of a cam follower arm 24, the free end of which carries a cam follower roller 26, which is normally held in contact with a rotary cam 28 by means of the weight of the platform 4 acting at the other end of the follower arm 24. The shape of the cam 28 is such that in one revolution the platform 4 starts from its highest position, moves slowly downwards for a short distance, then moves more rapidly to its lowest position where it remains for about one half revolution of the cam 28, and finally returns to its highest position by a rapid initial raising movement and a slower final raising movement.

Between the support 16 and the pedestal 18 the follower arm 24 carries, on a pivot, a vertical strut or latch 30 with a bevelled edge 32 at its upper end, which can engage a notch 34 in an arm 36 fixed to the support 16 to prevent the support and platform from being lowered. The edge 32 can be moved clear of the notch 34 by pivoting about its lower end towards the cam 28, but it is normally biased against such movement by a tension spring 38 acting between the latch 30 and a point on a short link 40 pivoted to the support 16 above the cam follower arm 24 and pivoted through a lost motion pin-and-slot connection 42 to a point on the latch 30 above the spring 38. Thus, normally, the latch acts to brace or support the support 16 against pivotal movement relative to the link 22 and prevents the platform 4 from descending.

However, at the forward end of the platform 4 is a trigger 44 pivotally mounted at a point 46 below the surface of the platform, extending through a central notch 48 and pivotally coupled at its lower end to one end of a release rod 50, the other end of which is pivotally connected to the latch 30. Thus, when an article is moved on to the platform 4, the pressure of articles behind it on the guide 2 will move it against the trigger 44 to push the latch edge 32 clear of the notch 34 and thus permit subsequent lowering of the platform 4.

Such lowering, however, cannot occur except when the transfer platform 4 is in, or near, its uppermost position, for the notch 34 is positioned to be above the latch edge 32 only when the platform is lifted to its uppermost position at the end of the cam cycle.

Figure 2:
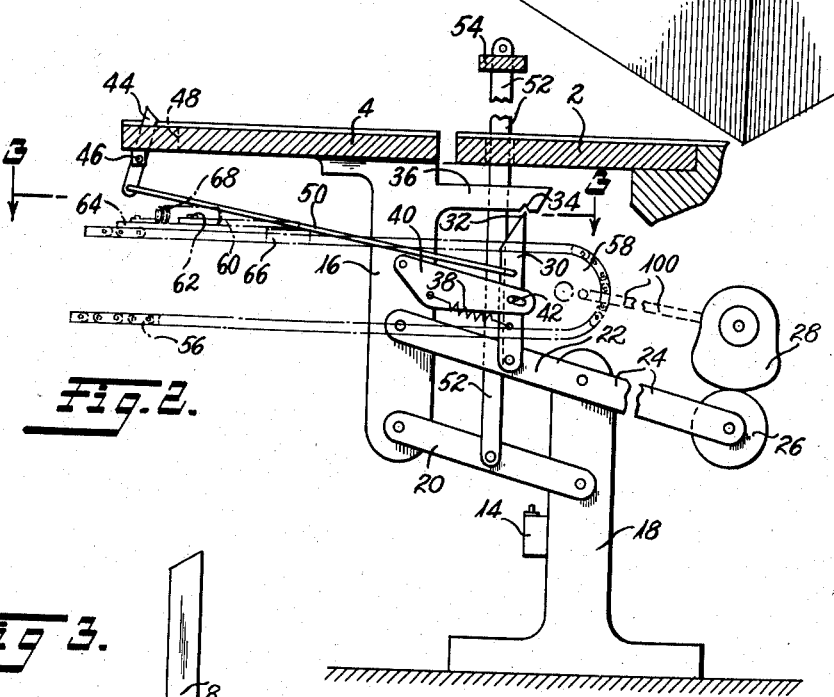
Fig. 2 is an enlarged fragmentary sectional view of the transfer-platform-operating mechanism taken along the line 2—2 of Fig. 1.

It follows that if an article arrives at the end of the platform 4 during an intermediate point in a revolution of the cam 28, the trigger 44 will be prevented from pivoting by engagement of the edge 32 in the notch 34 until the end of the cam cycle (as shown in Fig. 2) when the support 16 reaches its highest position and the notch 34 is lifted clear of the edge 32 to allow the article to pivot the trigger and push the latch 30 clear of the notch. Once the latch edge has cleared the notch, the platform 4 can drop to the extent permitted by the cam 28.

The lower link 20 of the parallelogram is coupled to a pair of vertical arms 52, one on either side of the input guide 2, which carry a clamping bridge 54 which is lowered with the platform 4 to clamp the next leading article on guide 2 and to prevent it moving on to the platform while the platform is lowered. The bridge may have its undersurface covered with foam rubber to prevent damage to the article. As an alternative arrangement, the platform 4 may have a vertical wall with an aperture for the articles. When the platform is lowered, the wall acts as a gate preventing articles leaving the input guide. It thus fulfills the function of the clamp.

The arrangement just described insures that however irregularly the articles enter the input guide 2, they are fed to the weighing platform at regular intervals.

The articles are moved from the lowered transfer platform 4 to the weighing platform 6 by means of a pair of conveyor arms 8 each driven by one of a pair of chains 56 moving in vertical planes and driven by such means as sprocket 58, one on either side of the feed path 2 and platform 4. Each chain 56 actually carries several arms 8 so that successive articles will be moved by different arms, but the operation of each arm is the same.

Figure 3:
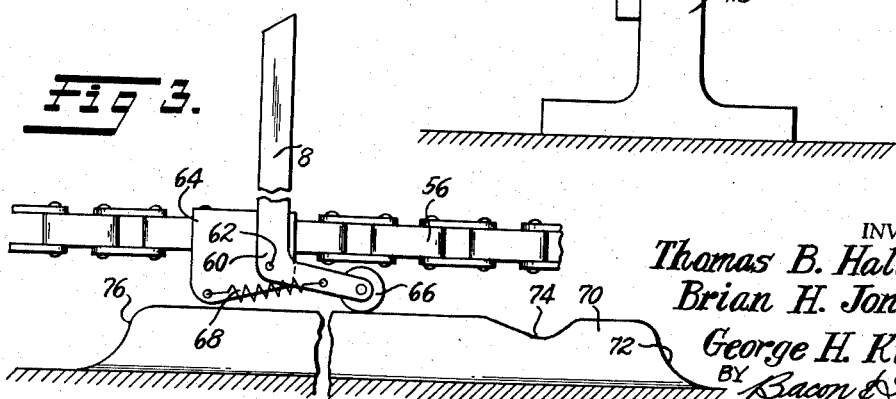
Fig. 3 is a plan view of the cam for controlling the movement of the conveyor arms, as seen along the line 3—3 of Fig. 2.

As can be seen from Fig. 3, each arm is in the form of a bell crank 60 pivotally mounted about a vertical axis 62 on a plate 64 secured to the chain 56. The arm 8 can pivot from a position in line with the chain to a pushing position perpendicular to the chain in accordance with the position of the shorter arm which carries at its end a roller 66 which is held by a spring 68 in contact with a cam track 70 fixedly mounted on the machine frame outwardly of the chain 56.

The spring 68 normally holds the bell crank 60 with the arm 8 in an inoperative position in line with the chain but when the first point 72 of the cam track 70 is reached, the roller 66 and the short arm are rotated (counterclockwise in Fig. 3) to extend the arm 8 just before it comes into contact with an article on the lowered transfer platform 4. The next part of the cam track 70 is parallel with the chain 56 except a slight dip 74 which gives the arm a slight backward velocity at the instant it makes contact with the article, which velocity is about equal to the forward speed of the chain 56, so that contact with the article is made without shock. Thereafter the arm is extended again by the other side of the dip 74 and the arm continues moving in this position until the article is nearly in the weighing position on platform 6, when the roller 66 follows a slight curve 76 of the cam track to cause the finger to move backwards at a gradually increasing speed until it is in the inoperative in-line position. By decreasing the forward speed gradually the article is brought slowly to a standstill and stops as soon as the finger is removed. If the finger were suddenly removed, the package would probably slide for a short distance over the weighing platform until stopped by friction. It is of course desirable that the article should always be in the same position during the weighing operation.

The operation of the fingers is the same whether or not an article is present on the lowered transfer platform, but if the transfer platform has not lowered due to there being no article on it, then the fingers merely pass under the platform and continue their cycle.

It is to be noted that the arms 8 can extend inwardly toward the center of platform 4 but their ends are far enough apart to provide clearance for passing the support 16, latch 30, and associated elements when the platform 4 is in its upper position.

Numeral 100 (Fig. 2) schematically represents suitable means for effecting drive of the sprocket 58 and cam 28 in timed relation so that a pair of arms 8 pass the position of the platform 4 each time the cam 28 turns to position to permit lowering of the platform. Any suitable driving and/or timing mechanism may be employed. The cam 28, it will be remembered, acts to positively lift the platform 4 but exerts no downward force thereon, it merely permits the platform to descend under the influence of gravity. In that sense the cam 28 may be referred to as a single acting cam.

While a single specific embodiment of the invention is shown and described herein, that embodiment is merely illustrative. It is intended that the invention encompass all forms falling within the scope of the appended claims.

We claim:

1. In article handling apparatus; a transfer device mounted for movement between first and second positions, means for delivering articles to said transfer device in said first position, means periodically movable through said second position to sweep articles from said transfer device, and means for operating said periodically movable means and for controlling movement of said transfer device in timed relationship thereto, said periodically movable means being continuously movable along a predetermined path passing through said second position and provided with an article engaging portion, and means for changing the speed of movement of said portion along said path at said second position.

2. In article handling apparatus; a transfer platform, means mounting said platform for generally vertical reciprocatory movement between predetermined upper and lower levels, means for depositing articles on said platform at said upper level, cyclically operable means for moving said platform to said upper level, latching means normally engaging and holding said platform at said upper level, release means responsive to engagement by an article on said platform for rendering said latch means inoperative, said cyclically operable means comprising a single-acting cam arranged to lift said platform, said latch means comprising a pivoted latch element, said release means comprising a lever pivoted to said platform and linking means connecting said lever to said latch element.

3. In article handling apparatus; a transfer platform, means mounting said platform for generally vertical reciprocatory movement between predetermined upper and lower levels, means for depositing articles on said platform at said upper level, cyclically operable means for moving said platform to said upper level, latching means normally engaging and holding said platform at said upper level, release means responsive to engagement by an article on said platform for rendering said latch means inoperative, a sweep member movable along a path intermediate said upper and lower levels and arranged to sweep articles from said platform when said platform is at said lower level, and means for operating said sweep member and said cyclically operable means in timed relation.

4. Apparatus as defined in claim 3 wherein said sweep member includes an article engaging arm on a movable carrier, and means for moving said arm relative to said carrier to vary the speed of movement of said arm relative to an article on said platform.

5. In article handling apparatus, a transfer device comprising; a substantially horizontal platform, a parallelogram linkage supporting said platform for substantially vertical movement, a rotary cam engageable with a portion of said linkage for lifting said platform to an upper level and then releasing said platform for descent to a lower level under the influence of gravity, said cam being configured to limit the rate of said descent, a restraining latch pivoted to a portion of said linkage, means normally holding said latch in position to engage a portion of said platform to prevent descent thereof, and latch releasing means movably mounted on said platform and movable by an article thereon, and means connecting said releasing means to said latch whereby the positioning of an article on said platform effects release of said latch to permit descent of said platform.

6. In article handling apparatus; a transfer platform, means mounting said platform for generally vertical movement between predetermined upper and lower levels, means for depositing articles on said platform at said upper level, cyclically operable means for moving said platform to said upper level and releasing the same for descent to said lower level, said mounting means for said platform being confined to the central portion thereof between opposed side edges, a transfer arm, operating means mounting said arm for movement along a path intermediate said levels and generally parallel to said edges, said operating means being positioned outwardly of said edges to permit vertical movement of said platform therepast, said arm extending inwardly from said operating means toward the center of said platform whereby to pass under and over said platform when the latter is at said upper or lower level, respectively, means for controlling movement of said platform and for moving said operating means in timed relation thereto.

References Cited in the file of this patent

UNITED STATES PATENTS

| | | |
|---|---|---|
| 1,116,406 | Fleischer | Nov. 10, 1914 |
| 1,780,486 | Jennings | Nov. 4, 1930 |
| 1,954,278 | Adams | Apr. 10, 1934 |
| 2,007,981 | Nordquist | July 16, 1935 |
| 2,417,782 | Petskeyes | Mar. 18, 1947 |
| 2,548,767 | Brest | Apr. 10, 1951 |